United States Patent [19]
Riley

[11] Patent Number: 5,263,661
[45] Date of Patent: Nov. 23, 1993

[54] SONIC BOOM ATTENUATOR

[76] Inventor: Jennifer K. Riley, P.O. Box 6032, Oxnard, Calif. 93031

[21] Appl. No.: 944,188

[22] Filed: Sep. 11, 1992

[51] Int. Cl.$^5$ .............................................. B64C 1/38
[52] U.S. Cl. .................... 244/1 N; 244/130; 244/205
[58] Field of Search ........................ 244/1 N, 130, 205

[56] References Cited

U.S. PATENT DOCUMENTS 3,106,663  10/1963  Tanner ........................... 244/1 N
3,446,464   5/1969  Donald ........................... 244/1 N
3,662,554   5/1972  De Brequeville ............... 244/1 N

FOREIGN PATENT DOCUMENTS 2244252  11/1991  United Kingdom ............ 244/1 N

OTHER PUBLICATIONS

Sin-I Cheug "An Analysis of Devices for Reducing Sonic Boom" May 1969.

*Primary Examiner*—Margaret A. Focarino
*Assistant Examiner*—Christopher P. Ellis

[57] ABSTRACT

The Sonic Boom Attenuator is a device designed for use with supersonic aircraft wherein a laser beam is shone down the leading edge of a short, rigid, straight, thin wing, heating thus rarefying the air before it passes over and under the wing. In this manner, the compression (which results from the rarefication) occurs more slowly as the relative wind passes through the beam than it otherwise would by impact with the hard surface of the wing. Because of the simplicity of design there are fewer components than have been proposed by other inventions and fewer mechanical devices to fail. Because of the rarefication, there is an overall reduction in drag to the aircraft and an attenuation of sonic boom in supersonic flight.

4 Claims, 2 Drawing Sheets

SONIC BOOM ATTENUATOR

CROSS REFERENCES TO RELATED APPLICATIONS

The Sonic Boom Attenuator (hereafter referred to as the Attenuator) can be used on any straight, thin, rigid, leading edge of an object moving through the atmosphere, but is primarily designed for use on the lifting air foils such as commercial supersonic aircraft, stealth aircraft, and rigid helicopter rotors. It can also be used on other forward surfaces or tail sections of any atmospheric craft, provided design criteria are met. (The rounded nose of a conventional fuselage would not be suitable, for example.) Additionally, some applications can be found with atmospheric reentry vehicles where it is determined to be of benefit in reducing shock to the structure or sonic boom.

BACKGROUND OF THE INVENTION

The invention relates to the use of an electromagnetic beam, a laser, used to interact with air molecules to heat and rarefy them. Physics and aerodynamics combine to artificially create a more preferred sonic condition over a wing.

In the preferred application, a laser can be shown down the leading edge of a rigid, narrow wing to the tip, heating thus rarefying the air through which the wing quickly passes. The air is re-directed—not suddenly as in striking the wing under normal conditions but more slowly through the width of the beam, leaving thinner (less dense) air to flow over the wing. This creates a higher density altitude, resulting in a lower indicated airspeed over the wing at any given true airspeed for the airplane as a whole. This creates a condition unfavorable for the formation of sonic boom.

This is preferable to other inventions which have been suggested in the past. Others do not work the same way and do not solve all the same problems, such as a device for ionizing then redirecting ions using their positive charge to a second charged device aft on the wing; electrophoresis and dielectrophoresis, which use electrostatic attractions to again re-direct air flow to a second charged device aft on the wing; and an electromagnetic force field to accelerate fluid rearward and push it aside. The principles of above inventions have some similarities to each other, but they are not like the Attenuator in that they do not significantly decrease initial relative wind impact with the hard, material leading edge of some structure or device, they do not use heat as the primary source of rarefication, and they are not single component/single stage devices. They're more mechanically complex, using such as multiple electrodes/terminals with different electrical charges or intensities, which are therefore more prone to failure.

SUMMARY OF THE INVENTION

The Attenuator is a laser beam directed along the leading edge of an aircraft wing to the tip. (The laser is housed in the fuselage and is not exposed to the wing.) When the aircraft is travelling at high speed, the air will heat and rarefy as it passes through the width of the beam, compressing more slowly than it normally would and creating (just above and below the wing) a higher local density altitude, resulting in a lower indicated airspeed over wing surfaces at any given true airspeed for the airplane. This produces a condition which is less favorable for the formation of sonic boom. There are advantages to the design: it is simpler, not as mechanically complex as other designs and therefore not as prone to failure; and it is "cleaner," in that the air is completely treated and rarefied before it ever touches the wing. (In other inventions, the relative wind is not completely rarefied before impact with the hard surface of some object, be it wing or protruding electrode.)

BRIEF DESCRIPTION OF THE DRAWINGS

FIG. 3 is another cross-section of the wing (A) showing the laser (B) ahead of it with the relative wind passing through.

DESCRIPTION OF THE PREFERRED EMBODIMENT

Figure 1:
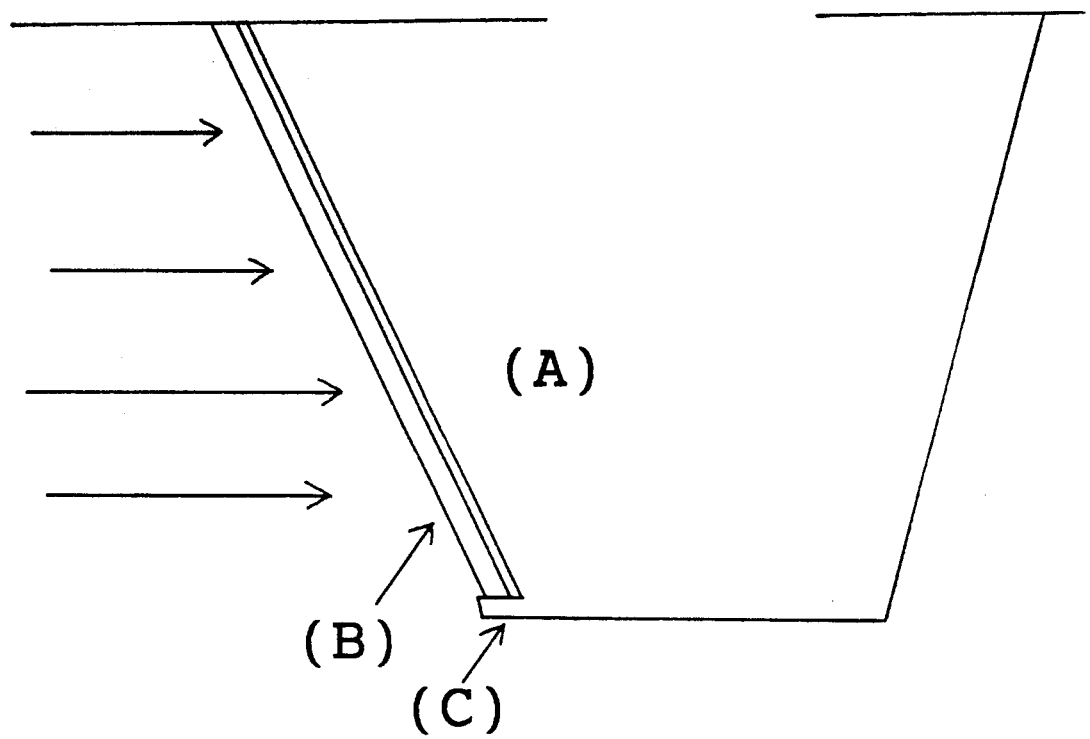
FIG. 1 is an overhead view of the left wing (A), with the laser ahead of it (B), and the wing-tip mirror (C).

As was stated earlier in this application, simplicity is one of the features of the Attenuator. FIG. 1 is an overhead view of a wing (A) with a laser beam (B) immediately ahead of it. The beam is shone out of the fuselage, down the leading edge of the wing immediately ahead of the cruise stagnation point of the wing (such that the relative wind must pass through it to reach the leading edge), to a mirror on the wing-tip (C). The beam is then reflected back over its original path relative to the wing, remaining in the loop to reduce power required for the laser.

With this beam operating (refer to FIG. 2), and the plane in flight, the relative wind will need to pass through the beam (FIG. 3, B) before hitting the wing (FIG. 3, A) during which time the air will rarefy.

Electromagnetic radiation interacts with matter as quanta. A quantum of radiation transfers both energy and momentum. When electromagnetic radiation is absorbed by an atom, the energy is degraded, raising the internal energy of the atom and hence the temperature. This is the source of and process for producing the heat in the air passing through the beam and is the primary source of rarefication. Of additional interest, however, is the radiation pressure exerted on the atoms by the transfer of momentum, assisting the process.

As the rarefied air then passes over the wing, the wing flies through an area of artificially-created high density altitude, resulting in a lower indicated airspeed over the wing for any given airplane true airspeed. In supersonic flight for the aircraft, then, the wing will itself be subsonic for any given flight condition, until the speed of the aircraft exceeds the ability of the beam to rarefy the air sufficiently before striking the wing.

Figure 2:
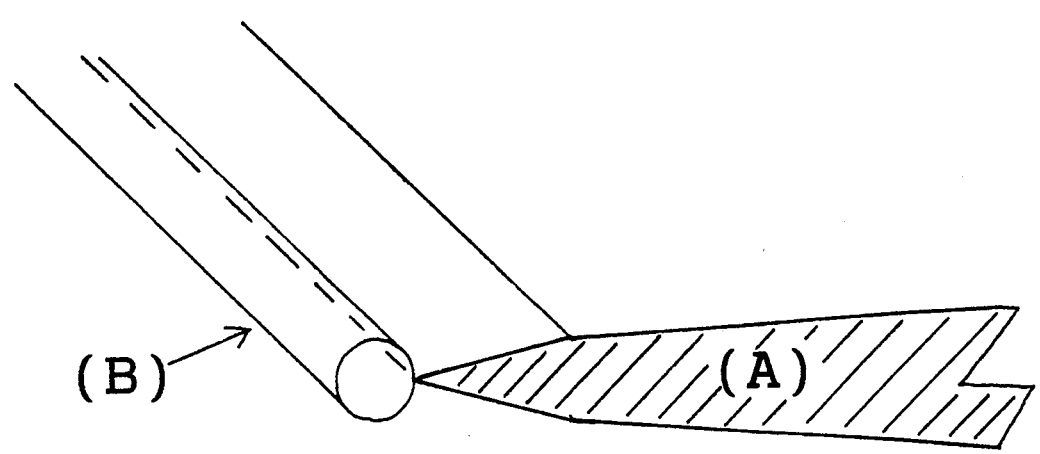
FIG. 2 is a cross-section of the wing (A) showing the laser (B) ahead of it.
Figure 3:
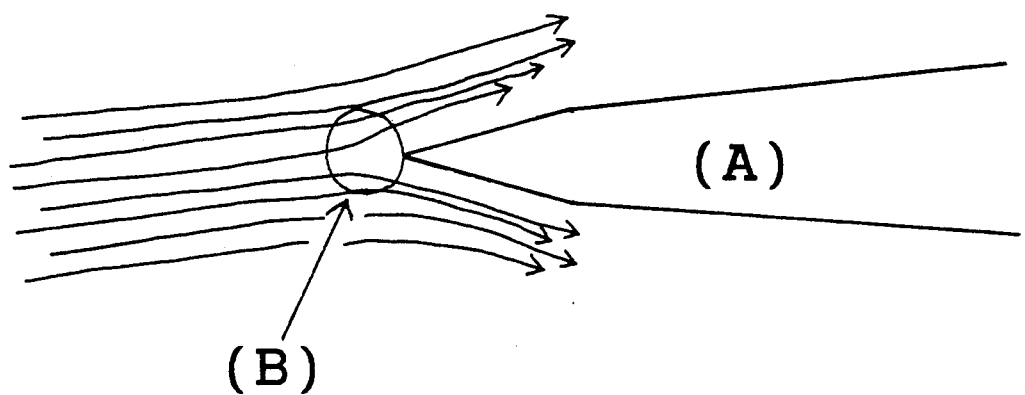

It should be noted, also, that the Attenuator will not work on just any wing. A long, thick, flexible wing would be contraindicated as (1) it would require a greater-diameter beam and increase in power required for the beam, and (2) the wing flex would not allow a straight laser to remain ahead of the stagnation point. Ideally, a short, thin, rigid, straight, sharp-edged wing would best suit the design needs of the Attenuator, as pictured (FIGS. 1, 2, and 3). As an example for description, and in the absence of a wing designed specifically for the Attenuator, the F-104 Starfighter wing would be one of the more preferable designs.

I claim:

1. A device for attenuating a sonic boom produced by an aircraft travelling at supersonic speed, said aircraft comprising an aerodynamic surface including a wing, said wing includes a leading edge and a tip, said device comprises a reflector coupled to said wing adjacent to said tip and a laser beam originating from within said aircraft, said laser beam positioned such that its beam shines spanwise along and adjacent to said leading edge thereby heating and rarefying the ambient air immediately ahead of said leading edge.

2. A device in claim 1 wherein said laser beam is emitted by a laser generator housed within the body of said aircraft and directed spanwise along said leading edge ahead of the stagnation point of said aerodynamic surface to said reflector.

3. A device in claim 1 wherein said reflector reflects said laser beam back over its original path relative to and ahead of said stagnation point of said aerodynamic surface, thereby retaining the energy and heating ability of the laser and keeping said laser in said path ahead of said stagnation point.

4. A device as in claim 1 wherein the section of said aerodynamic surface or wing is straight such that its length can be placed adjacent to said laser beam, and wherein said section of said aerodynamic surface or wing is rigid so as to remain aft of said laser beam.

* * * * *